(12) United States Patent
Cosma

(10) Patent No.: US 6,394,221 B2
(45) Date of Patent: May 28, 2002

(54) SWEPT IMPACT SEISMIC TECHNIQUE AND APPARATUS

(76) Inventor: Calin Cosma, 117A Walmer Road, Toronto, Ontario (CA), M5R 2X8

(*) Notice: Subject to any disclaimer, the term of this patent is extended or adjusted under 35 U.S.C. 154(b) by 0 days.

(21) Appl. No.: 09/725,169

(22) Filed: Nov. 29, 2000

Related U.S. Application Data

(63) Continuation-in-part of application No. 09/518,680, filed on Mar. 3, 2000, now abandoned.

(51) Int. Cl.$^7$ ................................................ G01V 1/02
(52) U.S. Cl. ........................ 181/113; 181/106; 181/121
(58) Field of Search ................................ 181/101, 102, 181/104, 105, 106, 108, 111, 112, 113, 114, 121, 122; 367/25, 912

(56) References Cited

U.S. PATENT DOCUMENTS

| 4,147,228 A | * | 4/1979 | Bouyoucos | 181/119 |
| 5,031,717 A | * | 7/1991 | Hardee et al. | 181/106 |
| 6,119,804 A | * | 9/2000 | Owen | 181/113 |

* cited by examiner

Primary Examiner—Khanh Dang
(74) Attorney, Agent, or Firm—Ridout & Maybee LLP

(57) ABSTRACT

A method of seismic investigation using the swept impact seismic technique involves measuring the response of a site to be investigated to a series of controlled impact sequences applied at different points of the site, each sequence using impacts generating pulses of energy at 100–2500 Hz., the impacts of the sequence having a repetition frequency swept between frequencies in the range of 10 to 500 Hz., the end frequencies having a ratio of at least 1.5 to 1, and the number of impacts in the sequence being at least 100 (and preferably at least 500). The invention also extends to apparatus for implementing such a method, comprising an electrically-actuated hammer having an impact frequency variable through a range of at least 1.5:1 within the range 10 to 500 Hz., and generating impacts characterized by substantial energy within a frequency range of 100–5000 Hz., a drive circuit for energizing the hammer to deliver a sequence of at least 100 (and preferably at least 500) impacts having a repetition frequency swept through a ratio of at least 1.5 to 1, and means for repositioning the hammer between sequences.

21 Claims, 11 Drawing Sheets

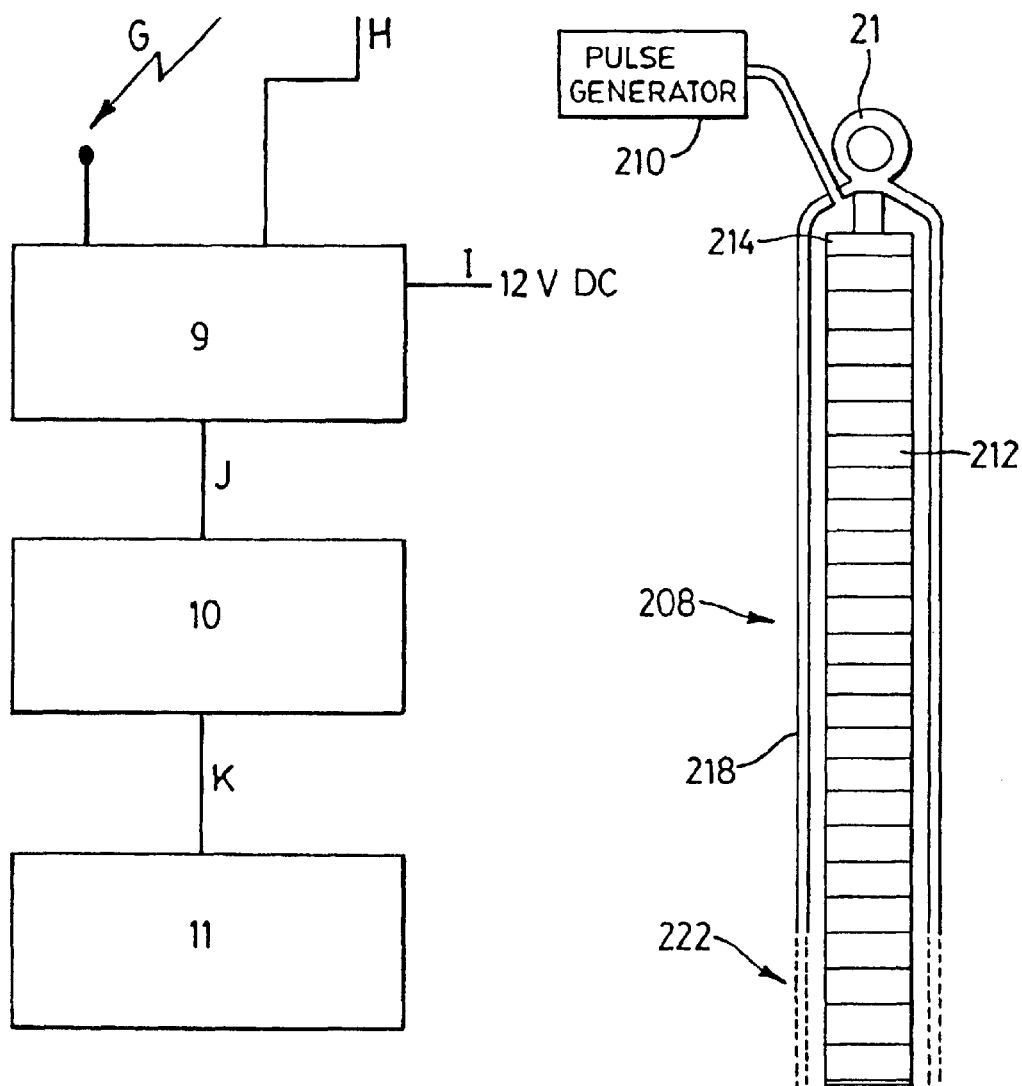

SWEPT IMPACT SEISMIC TECHNIQUE AND APPARATUS

This application is a continuation-in-part of 09/518,680 filed Mar. 3, 2000, now abandoned.

FIELD OF THE INVENTION

This invention relates to swept impact seismic techniques (SIST) and apparatus for performing SIST.

BACKGROUND OF THE INVENTION

High-resolution seismic surveys are carried out for locating and delineating ore and hydrocarbon deposits, for assessing the constructability ofrock and earth and for locating porous and possibly hydraulically conductive features with applications such as mining and exploration, rock engineering, monitoring of excavation works, disposal of hazardous waste.

The diversity of the applications of high-resolution seismics requires the data collection to be performed in very diverse conditions, e.g., in swamps, shallow water, on soil, gravel, pavement and rock, on tunnel walls and floors; in vertical, horizontal, up-going and down-going boreholes, drilled from the surface and from tunnels. The equipment must be able to operate in confined spaces and boreholes. The acquisition methods must be non-destructive and environmentally friendly. The while apparatus should be compact and mobile in construction and mining site conditions. Speed and routine are of the essence, to make the operation cost-effective. These are requirements for viable small-scale seismic investigation techniques.

A typical range for high-resolution surveys is hundreds of meters, which with favourable site conditions may be extended to 2 km. The minimum size of targets is of the order of meters, for localized anomalies, and fractions of a meter for laterally extensive features, e.g., fracture zones. To reach the desired resolution, small-scale seismic data must contain high frequencies of several hundreds Hertz (Hz) or more, which are usually associated with low-power sources. Conversely, the sources must deliver sufficient energy to carry the high frequencies through occasional highly attenuative media.

The high-frequency and high-energy requirements can be both fulfilled if the signal energy is built up over time, rather than being emitted as a short burst. The idea of injecting energy over a period of time is common to the technique known as Vibroseis (Crawford, J. M., Doty, W., and Lee, M. R., 1960. Continuous signal seismograph, *Geophysics*, 25, p.95–105), the Mini-Sosie (Barbier, M. B., Bondon, P., Mellinger, R., Viallix, J. R., 1976. Mini-SOSIE for land seismology. *Geophysics Prosp.*, 24, p. 518–527) and the SIST (Park, C. B., Miller, R. D., Steeples, D. W. and Black, R. A., 1996, Swept Impact Seismic Technique (SIST). *Geophysics*, 61, no. 6, p.1789–1803).

The Swept Impact Seismic Technique (SIST) is a combination of the Vibroseis swept-frequency and the Mini-Sosie multi-impact ideas. With SIST, a low power impact source generates a series of seismic pulses, hence the relation to Mini-Sosie. However, instead of a pseudo random coding of the impact rates, a deterministic, monotonously varying rate is used, i.e., a swept impact rate, which makes SIST akin to Vibroseis. SIST is, reportedly, more time-efficient than Mini-Sosie. Compared to Vibroseis, with SIST a firm coupling to the rock or ground is not as critical. This is a clear advantage, as a firm, wide band contact is difficult to achieve in all situations, considering the diversity of experimental conditions encountered in small-scale surveys. Besides, the SIST apparatus is simpler and more portable than Vibroseis.

SUMMARY OF THE INVENTION

The SIST concept has previously been tested with shallow reflection applications, at low frequencies. We have now found SIST used with higher frequencies, to be a viable solution for high-resolution surveys, on ground surface, in underground openings and in boreholes, both methodologically and logistically.

According to the invention, a method of seismic investigation using the swept impact seismic technique comprises measuring the response of a site to be investigated to a series of controlled impact sequences applied at different points of the site, each sequence comprising impacts having a minimum repetition frequency in the range of 5 to 200 Hz and a maximum frequency having a ratio of at least 1.5 to 1 to the minimum frequency and the number of impacts in the sequence being at least 100.

The invention extends to apparatus for implementing such a method, comprising an electrically-actuated hammer having an impact frequency variable through a range of at least 1.5 to 1 within the range 10–500 Hz, and generating impacts characterized by substantial energy within the frequency range 100–5000 Hz, a drive circuit for energizing the hammer to deliver a sequence of at least 100 and preferably at least 500 impacts having a repetition frequency swept through a ratio of at least 1.5 to 1, and means for repositioning the hammer between sequences.

The apparatus may for example be configured to be applied to a surface of the site, which may be a ground surface or the wall of a tunnel, in which case the repetition frequency of the impacts is preferably in the range of 15–30 Hz., or within a borehole in which case the repetition frequency is preferably in the range 70–180 Hz.

Further features of the invention will become apparent from the following description with reference t the accompanying drawings.

BRIEF DESCRIPTION OF THE DRAWINGS

FIGS. 1A, 1D and 1E are schematic diagrams of the components of a first embodiment of the apparatus of the invention, intended for surface application, while FIGS. 1B and 1C show alternate impact plates for use with the apparatus;

FIG. 6 is a schematic diagram of an embodiment of apparatus intended for use in conjunction with boreholes;

DESCRIPTION OF THE PREFERRED EMBODIMENTS

Figures 1A, 1B, 1C, 1D:
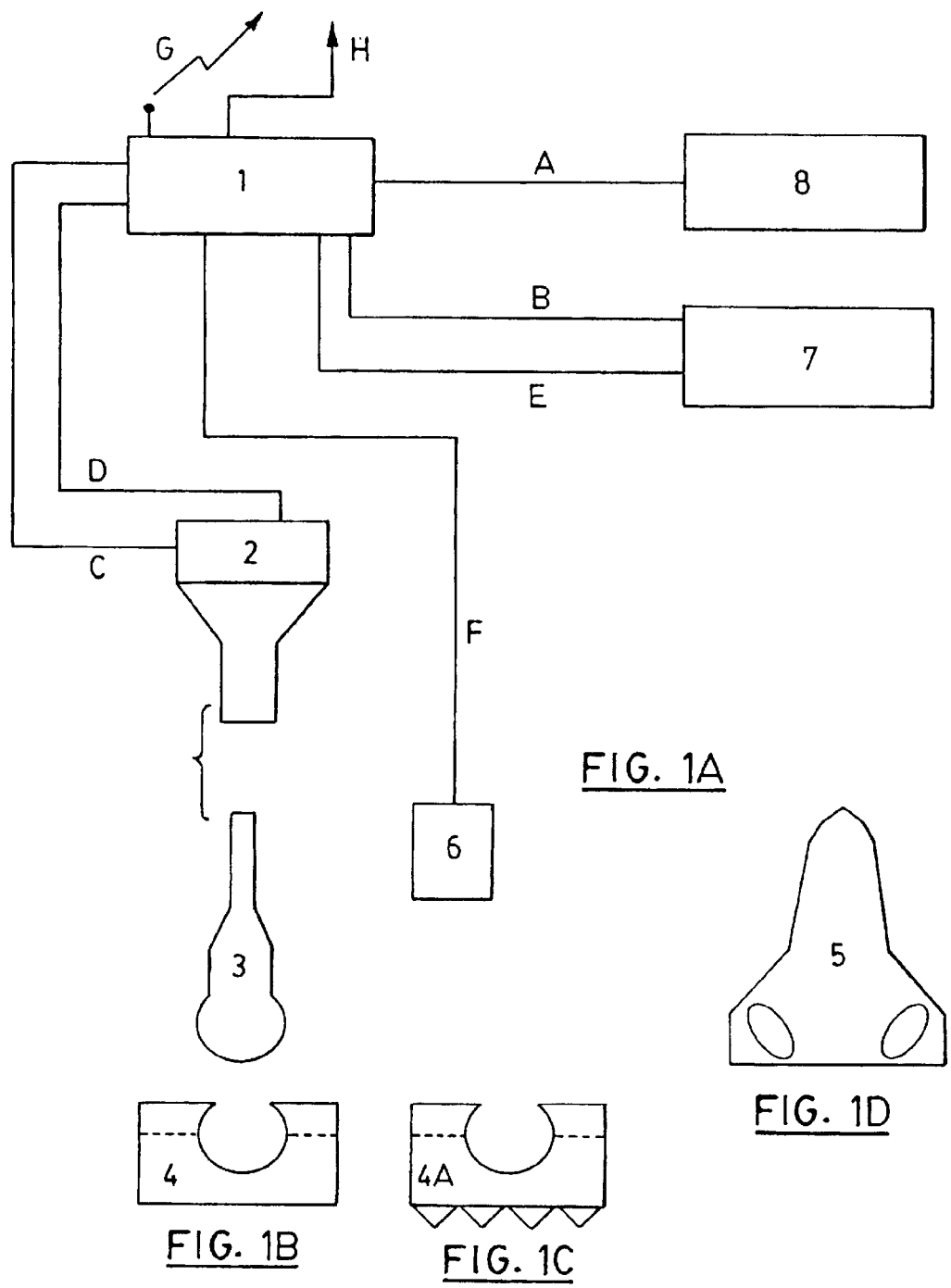
Figure 2:
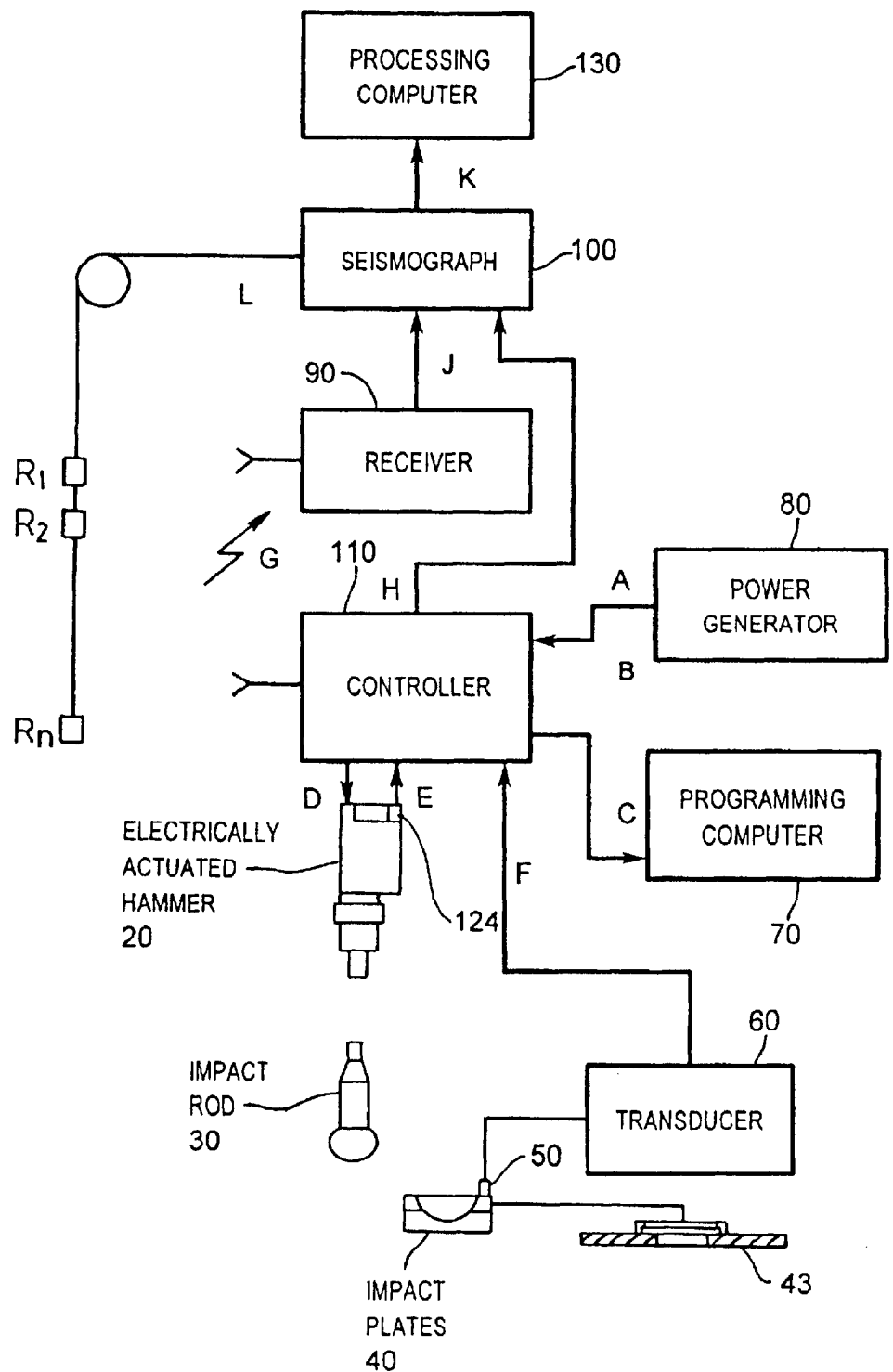
FIG. 2 is a schematic diagram of a modification of the embodiment of FIG. 1.

Referring to FIG. 1A, 2 represents an electrically-actuated hammer, which may be a conventional electric demolition hammer such as sold by Milwaukee Electric Tools and others, and fitted with an impact rod 3. Different impact plates 4 and 4A (FIGS. 1B and 1C) may be applied for hard and soft surfaces respectively. The stroke rate of such a hammer may be varied substantially linearly by varying the supply voltage, over a range, for example, of 20–80 Hz. The energy content of each impact does not depend on the input voltage, being typically about 20 J (depending on the power of the hammer). The voltage input to the hammer in line C is controlled by a controller 2 according to signals on line B from a computer 7, the controller 1 receiving electrical power on a line from a generator 8 or other power source. The controller receives an enable signal on line D from a switch on the hammer 2, after positioning of the hammer using a handle, to initiate an impact sequence and then controls the repetition frequency of the impacts by causing the control circuit to sweep the potential applied to the hammer on line C over a period equal to the length of the desired impact sequence, which should be at least 100 impacts and will typically contain 500 impacts or more. The hammer is coupled to the rock or other material to be investigated by pressing an impact plate against it through the rod 3, and is readily moved to successive application points in that it is a hand-held tool.

Signals from the site being mapped are picked up by a receiver transducer 6 and passed on line F to the controller 1 whence they may be passed by a radio link G or a landline H to a receiver 6 (see FIG. 1E) which forwards the signals to a seismograph 10 including a computer which processes the signals and either displays and saves the processed signals or passes them to an optional processing computer 11 for display and storage.

The computer 7 is optional and its functions in determining the impact sequence generated by the controller 1 may be built into the latter, with external controls provided for setting up a desired sequence.

Referring to FIG. 2, the hammer unit of this embodiment is again based on a conventional electrical demolition hammer 20, modified by substituting a spherically terminated impact rod 30 in place of the conventional chisel, the spherical termination being fitted with an impact plate 40. This may have a plane sole as shown for engagement with hard surfaces, or protuberances as shown in FIG. 1C to improve engagement with soft surfaces. The presently preferred hammer is type US 427/1800 W manufactured by Bosch, although other similar hammers may be used. The spherical termination allows the plate 40 to articulate so as to improve engagement with the surface of the test site, typically through about 35 degrees relative to the axis of the impact rod.

Depending on soil characteristics such as hardness and slope, the impact plate 40 may have different characteristics designed to obtain proper acoustic coupling to the surface, which coupling should be as tight as possible to prevent secondary shocks due to recoil of the hammer. For the same reason, a seating plate 43 may be used to secure the impact plate 40 to the rod 30. Modified articulated positioning systems, including weight compensation and/or recoil attenuation devices, can be used for applications requiring the shocks to be applied at an angle to the impact rod axis.

Figure 3:
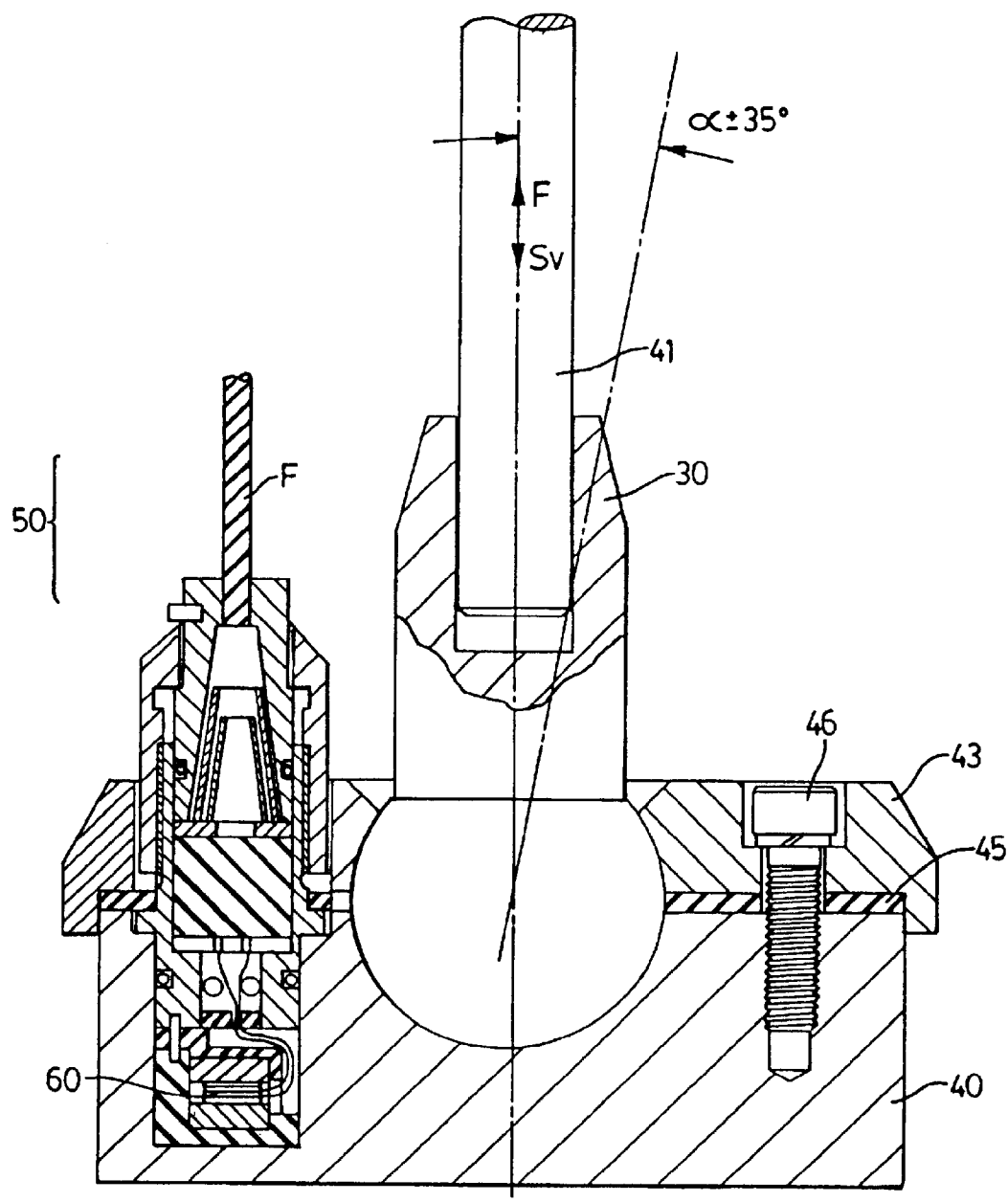
FIG. 3 is an enlarged view of the impact rod and impact plate shown in FIG. 2.

Further details of the impact plate and associated parts are shown in FIG. 3. The actuator of the hammer 20 is pressed into impact rod 30, the spherical end of which is held in a socket of the impact plate 40 by the plate 43 secured by bolts 46 through a rubber washer 45 having a minimum hardness of 70 Shore.

A trigger device 50 is mounted into the impact plate 40, through an elastic mounting designed to attenuate shocks transmitted from the plate during operation.

The shock rate of the hammer 20 may be varied linearly, over a range of about 15–30 Hz, by varying the supply voltage; the available range may vary for different hammer types. The energy content of each impact does not depend on input voltage; a typical hand held electric demolition hammer delivers about 20 J per impact. The generated frequency range extends well beyond 2 kHz.

Referring to FIG. 2, a controller 110 provides a controlled supply voltage to the hammer 20 on line D. The controller is powered via line A from a power generator 80 or alternative electric power source. An impact coding function is generated by a programmable computer 70 on line B and it is either used as such or it is stored in the memory of the controller 100 to be used later. Using the computer 70 provides greater versatility because virtually any sweep function may be programmed whereas only linear saw-tooth functions are readily set up by the control panel, which allows for the selection of sweep time, voltage gain determining the ratio of minimum to maximum impact rate, and offset voltage determining the minimum impact rate.

In either case the controller 110 must receive an enable signal from the operator of the hammer 20 to start the sweep. The operator positions the plate 40 against the surface of the test site and presses a switch 124 on a handle of the hammer which sends a signal on line E to the controller to initiate a sequence of impacts. According to the setting of the switch SW1, the controller generates the sequence either according to its own programming or programming received from computer 70 on line B in response to a signal transmitted on line C.

The response of the site is sensed by a prepositioned chain of seismic signal receivers (accelerometers, geophones or hydrophones) $R_1, R_2, \ldots R_n$ and transmitted to a seismograph 100 via a long geophysical cable L. Recording of response signals is triggered by rectangular pulses generated by the controller 110 and fed to the seismograph 100 on line H. The trigger sensor 60 is a small piezoelectric sensor or geophone incorporated in the trigger device 50, which sensor picks up mechanical shocks corresponding to the impacts for transmission to controller 110 on line F formed by an armored geophysical or coaxial cable.

Figure 4:
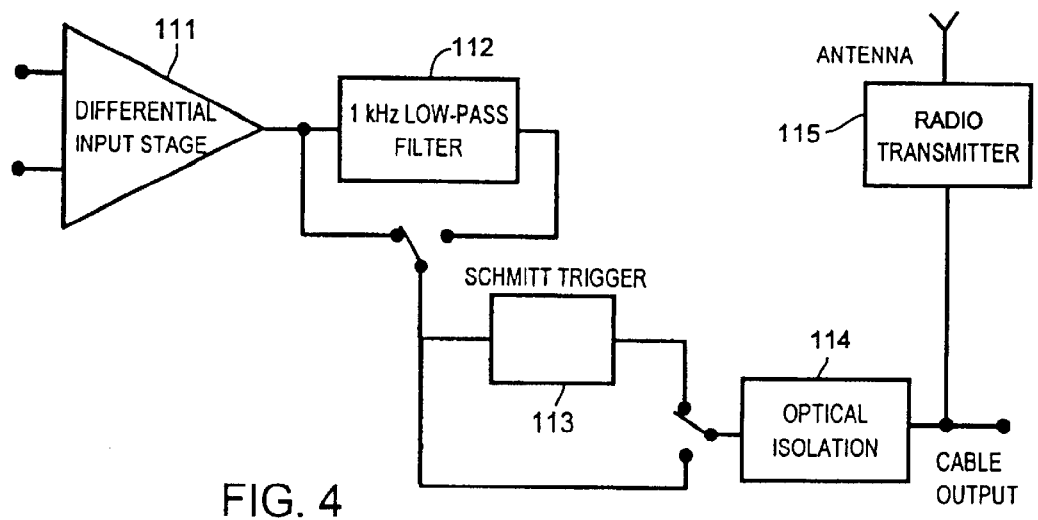
FIGS. 4 and 5 are schematic block diagrams of parts of the controller block of FIG. 2.

The controller 110 includes a trigger module (see FIG. 4), a firing module (see FIG. 5), and a power supply. Referring to FIG. 4, a differential input stage 111 receives the signal on line F from transducer 60. This signal is fed after optional filtering and shaping by a low pass filter 112 and/or a Schmitt trigger 113 to an optical isolation stage 114. The differential input stage rejects common mode noise and permits input sensitivity to be adjusted to avoid clipping of the signal, yet provide adequate amplitude to be detected by the seismograph which receives the output of stage 114 on line H. The optical isolation protects the seismograph 100 from spikes and transients, while the filtering and shaping reject noise and convert the transducer output into a single rectangular pulse with a fast rising edge which provides a steady timing reference for recording signals from cable L. The rectangular trigger signals may alternatively be modulated and transmitted by a radio transmitter 115 to provide a radio link G (see FIG. 2) to the radio receiver 90 and thence the seismograph 100. The transmitter may be incorporated in the controller 110 as shown or be a separate unit. In either case the seismograph is electrically isolated from the controller so as to reject spikes and noise present on the controller power supply and permitting the seismograph to be independently powered. The seismograph 100 processes the receiver signals on line L, and either displays or saves them, or passes them to an optional processing computer 130 for further processing and storage.

Figure 5:
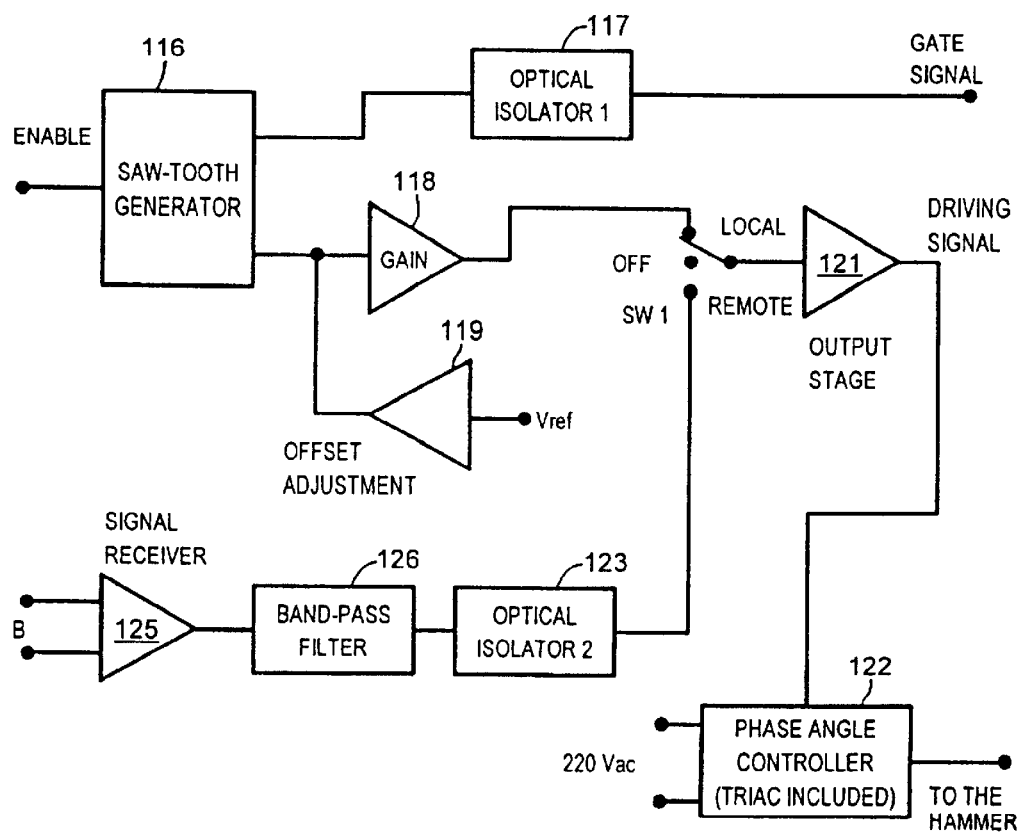

Referring to FIG. 5, the switch SW1 selects either a local signal from the controller or a remote signal from the programming computer 70. In the first case a saw tooth generator 116 programmed on the controller panel is enabled on receipt of the signal from switch 124, and the gain and offset of this signal are adjusted by amplifiers 118 and 119. The generator 116 also generates an enable signal applied to the seismograph 100 throughout the sweep via an opto-isolator 117. A remote signal from the computer 70 is amplified by a differential input amplifier 125, filtered by a band-pass filter 126 to remove spikes and high frequency noise, and passed to switch SW1 through an opto-isolator 123.

The signal selected by switch SW1 is amplified by amplifier 121 and applied to a phase angle controller 122, which modulates the supply potential of the power delivered to the hammer.

The power supply provides power to the various circuits, and includes an isolated DC/DC converter to power those circuits in direct connection with the seismograph 100 or the computer 70.

In FIG. 6, the electric demolition hammer is replaced by a piezo-electric hammer 208, and the control unit 1 incorporates a generator 210 of high voltage (e.g., 8000 Volt) pulses connected to electrodes between piezo-electric elements 212 secured in a stack between loading blocks 214 and 216. One of the loading blocks 214 is coupled to a casing 218 of the unit, and the other 210 is coupled to the walls of a borehole to be investigated either through perforations 222 in the wall of the casing, or by a known motor driven wedge system (not shown). This embodiment is suitable for use in boreholes, and the hammer may be moved through the borehole between successive locations, after releasing the wedge system, if necessary, by means of a cable attached to an eye 21 on the casing.

Figure 7:
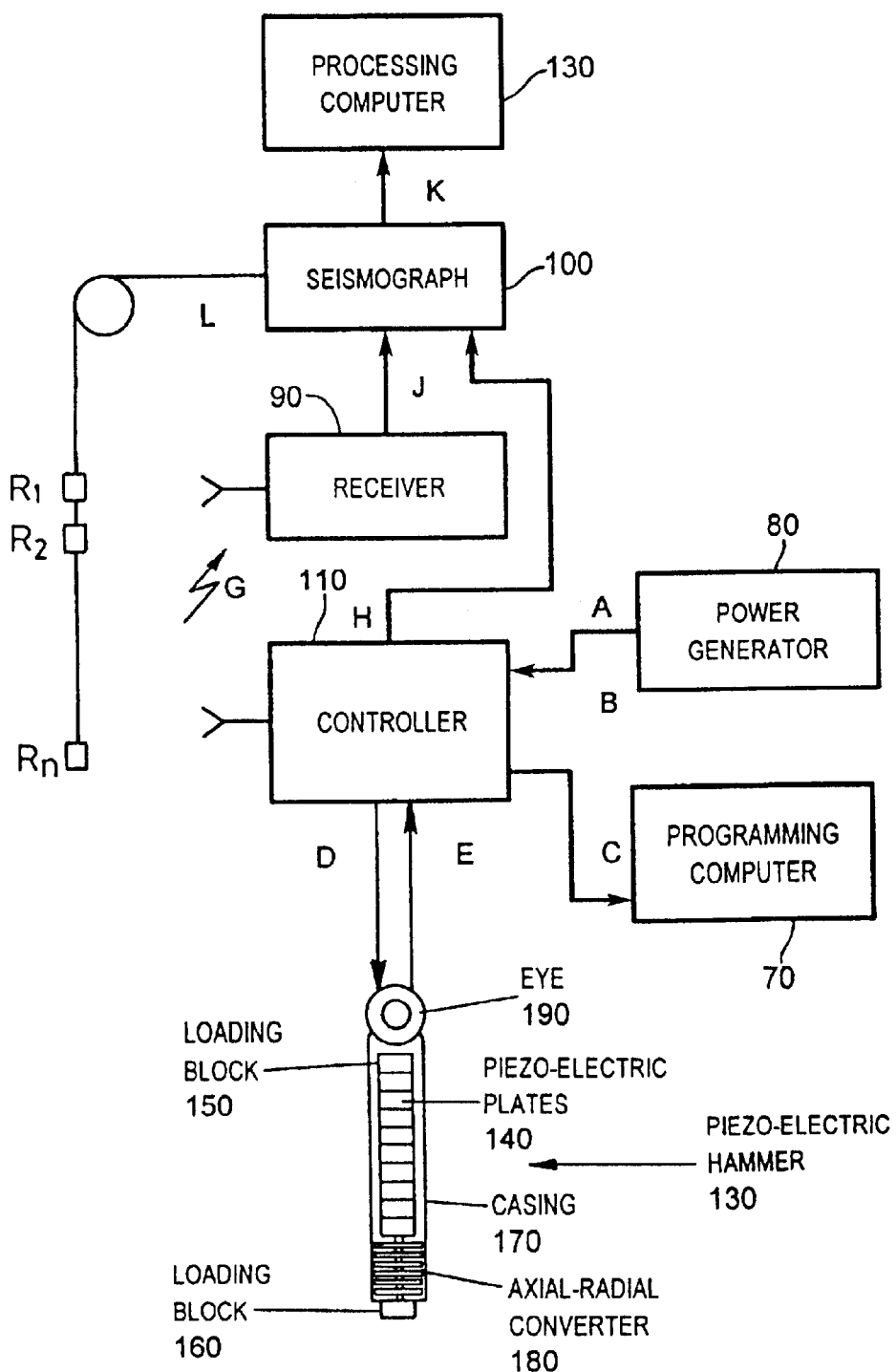
FIG. 7 is a schematic diagram of a modification of the embodiment of FIG. 6.

In FIG. 7 the electric demolition hammer of FIG. 2 is replaced by a hammer formed by stack of piezoelectric transducer plates 140 secured between two loading blocks 150 and 160. The loading block 150 is coupled to the casing 170 of the unit, while the loading block 160 is coupled to the wall of a borehole in which the unit is inserted by an axial to radial converter 180. A trigger sensor and local preamplifier are associated with the hammer, conveniently in a housing 500 (see FIG. 8) connected above the hammer by a cable 400 and couplings 190. The housing 500 also accommodates a pulse generating system described in more detail with reference to FIG. 12.

Figure 9:
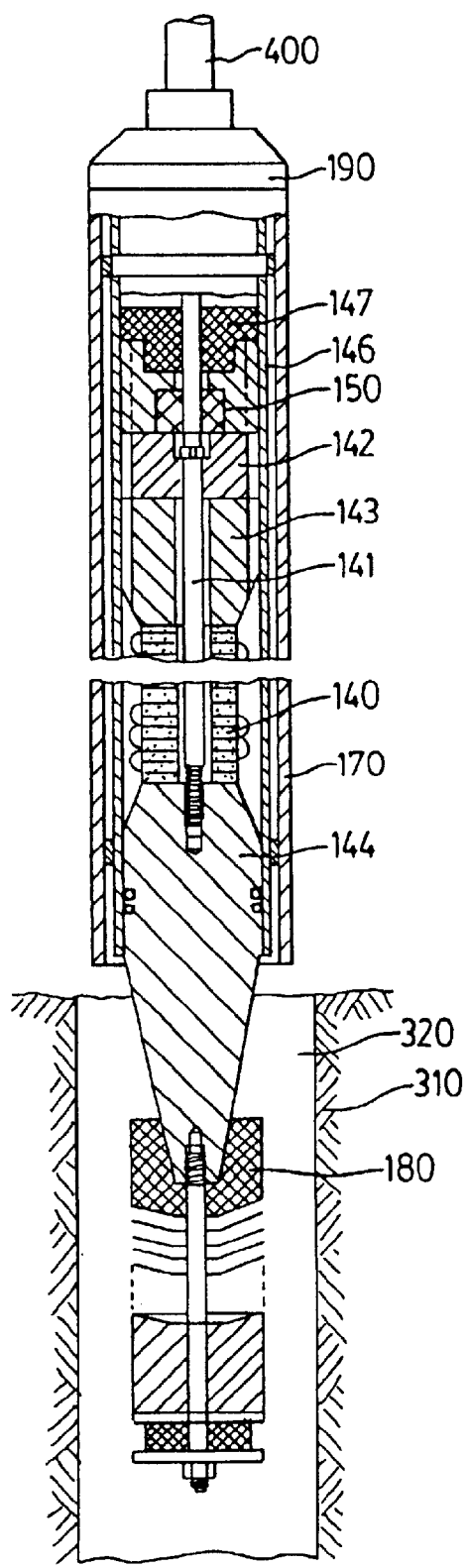
FIG. 9 is a mainly sectional view of a hammer portion of the apparatus shown in FIG. 8.
Figure 10:
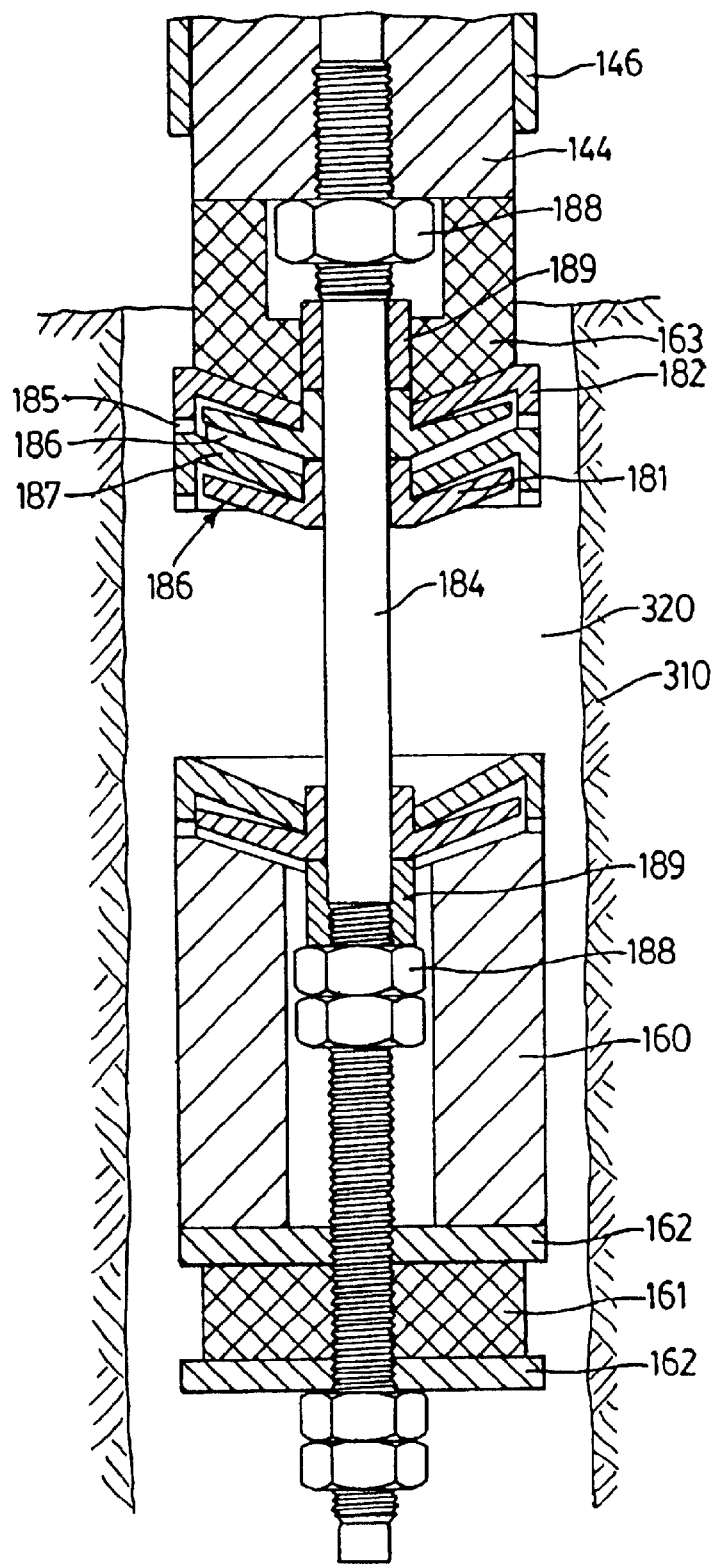
FIG. 10 is an enlarged fragmentary sectional view of part of the hammer portion of FIG. 9.

A sequence of high voltage pulses (up to 7 kV) from this generator is applied in parallel to the plates of the stack so that the elongations of the plates produced by the pulses are summed to produce an axial elongation of the stack which is transmitted to the converter 180 and thence to the wall 310 of the borehole 320. Two forms of converter 180 are exemplified. In the embodiment of FIG. 9 and 10, the impacts are transmitted through a series of perforations in the converter casing, using water filling the borehole as a transmission medium, while in the embodiment of FIG. 11 transmission is through a motor driven wedge system. In both cases the loading block 160 provides an inertial mass.

The stack typically comprises at least 45 piezoelectric plates 140 clamped by a rod 141 between end blocks 142, 143 and 144 within a tube 146 within the casing 170. The rod 141 acts as a spring compressing the stack, which on receiving a pulse expands with a force equal to that developed by each plate in the stack, through a stroke equal to the sum of the expansions of the plates. The loading and damping provided by the loading block 150 and a damping element 147 are selected so that maximum displacement occurs downwardly (as seen in the drawings) and reflections in the opposing direction are largely absorbed by the element 147.

Figure 8:
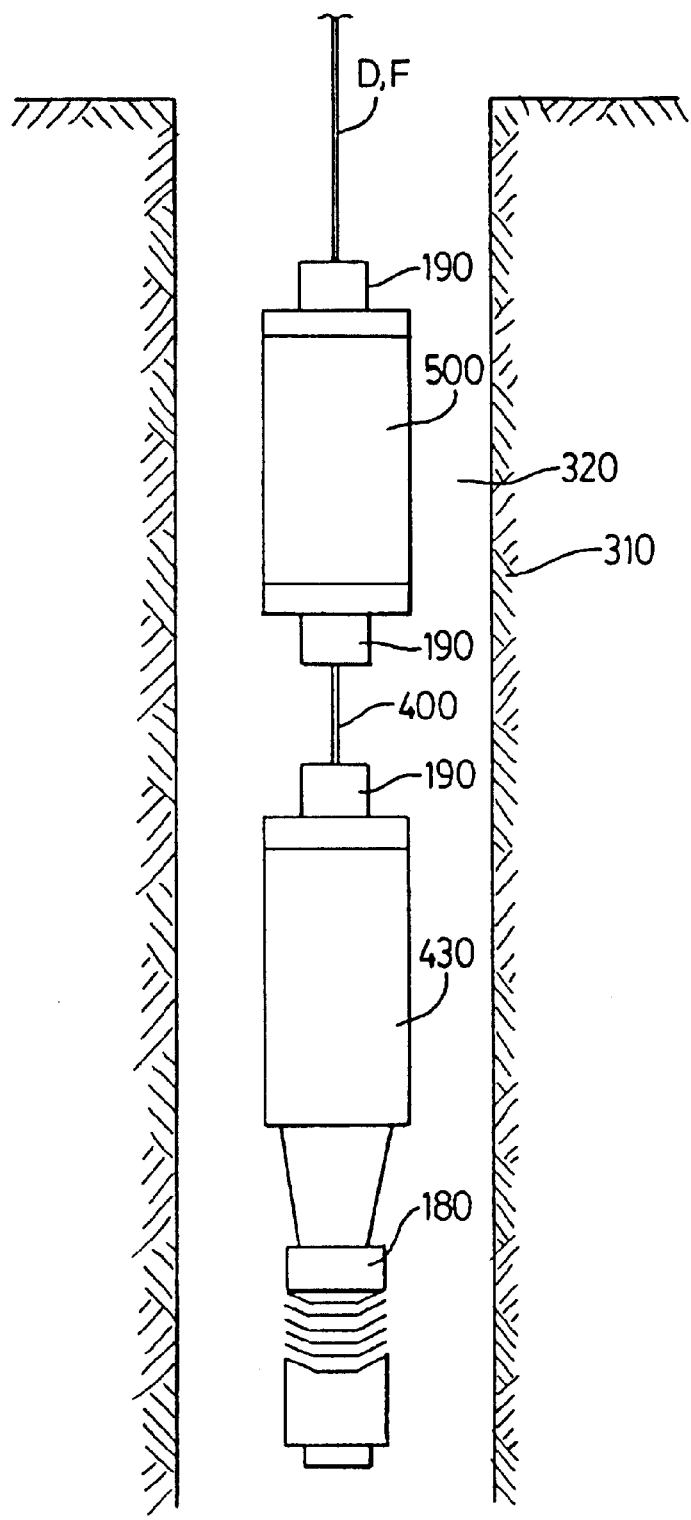
FIG. 8 is a fragmentary section of a borehole showing portions of the apparatus suspended therein.

In the water coupled converter shown in FIGS. 8, 9 and 10, water is compressed between plates of a stack of alternating metal plates 181 and 182 (see FIG. 10), the plates 181 of which receive the impacts of the hammer through a rod 184 connected to the block 144, while the plates 182 are stacked, through circular peripheral flanges forming a converter casing and defining openings 185, on the loading block 160. The impacts result in water trapped between facing surfaces 186 and 187 being ejected radially through the openings 185 and impacting on the wall 310. The plates 181 are secured on the rod 184 between nuts 188 and collars 189, while an extension of the rod through the loading block 160 supports the latter through an energy absorbing block 161 and washers 162, the block in this example being of polyurethane with a Shore hardness of at least 92. A further block 163 of similar material is located between the topmost plate 182 and the block 144. Initial clearance between the surfaces 186 and 187 is typically in the range 1.35–2.2 mm for borehole diameters of 33 to 100 mm diameter, while the outer diameter of the converter 180 should be about 2–4 mm less than that of the borehole 320. The length of the converter 180 should be about half the wavelength in the converter of the resonant frequency of the piezoelectric hammer, which may for example be about 2100 Hz. This wavelength may be adjusted by suitably selecting the length of the collars 189 and the number of pairs of plates 181 and 182, typically 10–15.

Figure 11:
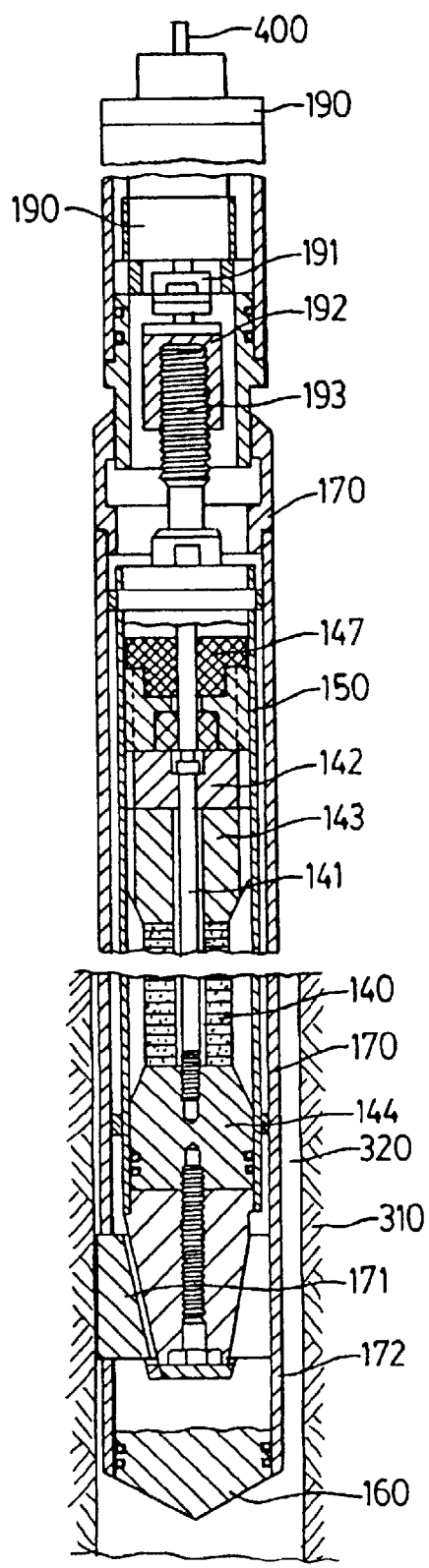
FIG. 11 is a view, mainly in section, of an alternative embodiment of hammer.

In the embodiment of FIG. 11, the converter is mechanical, energy developed by the hammer being transferred radially to the wall of the borehole through wedges 171 located in slots in an extension 172 of the casing 170 and engaging guide slots 173 in a coned surface of the block 144. Typically there are three wedges with 120 degree spacing. The piezoelectric hammer 150 is longitudinally movable within the casing 170 so as either to force the wedges against the wall 310 at a test site or to release them so that the apparatus may be moved longitudinally within the bore 320. A geared motor 190 drives a nut 192 through a coupling 191, the nut in turn driving a screw 193 supporting the hammer 150 within the casing. The motor is reversible and the current it draws is sensed so that when torque rises as the wedges engage the bore wall 310 or the screw is fully retracted, it shuts off.

Figure 12:
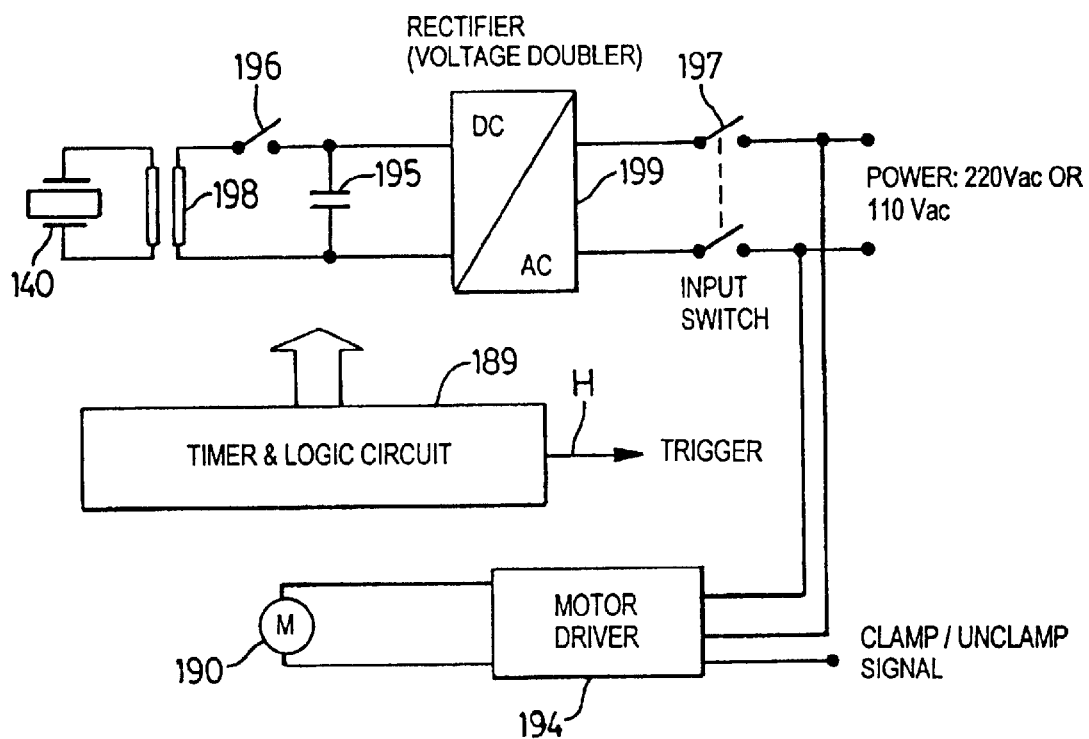
FIG. 12 is a schematic diagram of a controller unit for use in the embodiment of FIG. 7.

The controller 110 is functionally somewhat similar to that of FIG. 2, but differs in its manner of controlling the repetition frequency of the hammer and delivering power to the latter, as shown in FIG. 12. In this embodiment the power supply voltage is constant. As well as driving the motor 190 through a motor driver 194 (only for the embodiment of FIG. 11, in which it also provides a clamp-unclamp signal controlling the direction of the motor), it charges a capacitor 195 through a rectifier 199, preferably of the voltage doubler type, which capacitor is discharged at a repetition frequency which is programmed as previously described by closing an electronic switch 196, typically a thyristor, and opening electronic switch 197 to isolate the supply. The capacitor discharges through the primary of a transformer 198 to generate a high voltage pulse across the transducers 140. Advantageously the discharge circuit is tuned to the resonant frequency (e.g. about 2100 Hz) of the transducer stack to increase efficiency The switches 196 and 197 are controlled by a timer and logic circuit 189 which also generates trigger signals at each discharge for application to line H to control the seismograph 100.

Utilization of such tools to provide SIST data is discussed further below:

A SIST coded record can be written as:

$$r_c(t) = \psi(t) * s(t) + n(t) \qquad (1)$$

where $\psi(t)$ is the controlled impact sequence, s(t) is the source signature, e(t) is the earth impulse response and n(t) is the noise. Following Park (Park et al, 1996), a "normal" seismic record can be obtained by cross-correlating the controlled impact sequence $\psi(t)$ and the coded record $r_c(t)$:

$$r_d(t) = \psi(t) \otimes r_c(t) = ACF\{\psi(t)\} * s(t) + \psi(t) * n(t) \qquad (2)$$

A key assumption in equation (2) is that the autocorrelation function ACF $\{\psi(t)\} \cong 0$ everywhere except at zero-lag. In practice, the degree of compliance with this condition will provide a way to evaluate the performance of various coding schemes.

Several time functions were studied and compared with the linear frequency scheme. In particular, an inversely linear frequency (linear period) was found to be effective. A 15–30 Hz., 30 s, 675-pulses linear frequency sweep was tested. It was noticed during the study that with the linear-period scheme the band could be narrowed to 18–30 Hz without an apparent loss of quality. This was done primarily for practical purposes, as a narrow bandwidth simplifies the mechanical construction of the source. In spite of the narrower band, the linear-period sweep led to a more effective cancellation of the correlation noise.

A source signature with a frequency band of 800–1800 Hz has been used with modeling, corresponding to the experimentally-determined spectrum of several small-scale SIST sources.

In theory, the high limit of the impact frequency band should be as low as possible, to reduce correlation noise. In practice, it turns out that there are considerable benefits in increasing the impact frequency as much as possible, up to 180 or even 200 Hz. in borehole investigations, provided that the quality of the decoded signal does not decrease noticeably.

Two sweep ranges were tested, one of 18–30 Hz and the other of 90–150 Hz. The sweep duration of the former was 30 s, the latter only 6 s which, if signal quality can be maintained, represents a significant improvement of performance. Since production of a tomographic section of a site being investigated requires thousands of measurements which have to be recorded, inspected for quality assurance, and decoded, the time needed for all these operations depends on the sweep length. In fact, the time-domain-signal decoded from the 6 s sweep looked as clean, or arguably cleaner, than the 30 s signal. The characteristics of the noise were the same in both cases.

The sweeps were contaminated with 60–2000 Hz uniform random noise and noise bursts with bands of 50–200 Hz and 600–1350 Hz. The random noise was twice the amplitude of the source signals. The burst amplitudes were 10 times higher and the mean rate is 6/second and 10/second, respectively. These noise levels, however extreme they may seem, represent realistic conditions, e.g., in a production area of a mine.

As in equation (2) $\psi(t)=1$ at the moments of impact and $\psi(t)=0$ at any other time, the cross-correlation can be replaced by summing to provide simple "Shift-and-stack" averaging. For purely random noise, the S/N of the sum signal will decrease by the square root of the number of impacts. However, in real life, the straight sum may not be the most efficient way to increase the S/N ratio. As shown below, SIST techniques based on more elaborate procedures than the shift-and-stack average, possess an even higher capability to suppress noise.

Three techniques were tested for processing the signals obtained: average, median and alpha-trimmed median. The noise was the same combination of uniform random and bursts as described above. The signal was initially invisible in the unprocessed signals. The time-domain signals obtained by all techniques for the power spectrum of the signal somewhat resembled that of the applied impact, with median techniques providing better results than simple averaging.

Investigations were carried out at the Grimsel Test Site in Switzerland to compare known techniques with those of the invention. The rocks at the Grimsel Test Site (GTS) are Paleozoic granite and granodiorite that have been heavily deformed and altered during the Alpine orogeny. Consequently, the seismic transparency of the rock at GTS is very low, corresponding to a Q factor of 10 to 20. Earlier studies regarding the performance of various seismic sources suggested that a suitable combination of high frequency and high energy for mapping the site could be reached only by explosive sources. The fact that explosives are able to produce both high energy and frequency in a burst is because the high energy results from the high speed of the particles during the detonation rather than from the movement of a large mass. The low seismic transparency of the GTS rocks was overcome by using the SIST concept in accordance with the invention. Measurements were performed in a rock block positioned between two gently down-going boreholes, 120 m apart, 150 m and 190 deep (BOUS 85.003 and ADUS 96.001) and a tunnel WT, perpendicular to the boreholes. The measurements performed included tunnel-to-hole and crosshole measurements. The maximum source-receiver distance was around 200 m.

A first measuring campaign was carried out with single-pulse sources. 30-component accelerometers were clamped in one of the holes and the sources were fired in the other hole and in the tunnel. A piezo-electric and an electromechanical source, both single-pulse, were used. The conclusion from this campaign was that single-pulse sources are not suitable for high resolution surveys because, on one hand, increasing the source power to increase S/N ratio narrows the frequency band of the seismic pulse, and on the other hand, increasing the total energy by on-line stacking takes too long, for routine operations.

A first attempt at using standard construction site equipment to build a SIST source used a modified 1 kW electric hammer drill. A 20–80 Hz impact frequency band was generated by varying the input voltage. It is important to note that the amplitude of the pulse does not depend on the input voltage and it was found that the impact frequency varied linearly with the voltage. These characteristics make electromechanical sources computer-controllable, by adjusting the voltage as a function of time. Various impact frequency schemes can thus be generated.

Several models of surface and tunnel-wall electromechanical SIST sources have been tested. A typical held-held 1.5 kW electric demolition hammer delivers 20 J per impact, at a mean impact rate of 25/second. The energy delivered in a 20 s sweep is 10 kJ, which compares with a midsize drop-weight. The signal frequency, though, goes well beyond 1 kHz, while a drop weight of comparable energy, used in similar conditions, remains in the low hundreds of Hz.

GTS tunnel-to-hole surveys carried out with a SIST source as shown in FIG. 1, applied to the tunnel wall and an array of down-the-hole accelerometers in the boreholes, produced spectra in which frequencies above 1 kHz tend to be lost in steps, corresponding to zones of fractured and altered rock crossed by the Seismic signal. However, frequencies of up to 2 kHz can be observed all the way to a depth of 110 m, which corresponds to a source-receiver distance of approximately 140 m. The frequency content at the receiver end was higher than obtained, with single-pulse sources. It was also higher than reported by earlier seismic investigation programmes carried out at the same site (B ühnemann, 1998).

Piezo-electric SIST sources (see FIG. 2) for investigation depths up to 1 km and for borehole diameters from 46 to 100 mm were built based on an existing single-pulse piezo-electric impact generator (hammer) model PH52 from Vibrometric. The seismic signals are produced by applying controlled sequences of high voltage pulses to the stack of piezo-electric ceramic elements. The frequency band produced is 500–2500 Hz and could be adjusted. The source is clamped to the borehole wall by a motor-driven wedge mechanism, or by coupling of the source through the borehole water, as shown in FIG. 2. This latter arrangement is preferred since the delays in operating the clamping mechanism otherwise severely limit the rate at which impact sequences can be performed, and discount the advantages of the invention.

The technique of the invention proved capable of characterizing a rock mass at the test site, providing a level of detail necessary for the construction of tomographic images, despite the fact that fracturing and extensive lamprofyre dikes brought the average Q-factor of the rock as low as 10.

The proof of the ability of high-resolution seismic techniques to detect and characterize rock discontinuities was made by characterizing a rock block delimited by two parallel, gently dipping boreholes and a tunnel perpendicular to them.

The rockmass characterization included the determination of the 3-D positions and orientations of rock features by multi-offset VSP and crosshole imaging and the tomographic mapping of seismic velocities. The structural model was constructed by joint analysis of reflection and transmission data.

The main groups of reflectors were located and their existence and position confirmed in borehole and tunnel profiles. One of the main sets strikes roughly perpendicularly to the tunnel dipping approximately 60°. This set is abundantly represented in the tunnel as lamprofyre dikes. Another set dipping 60° strikes nearly parallel to the tunnel and consists of zones of dense fracturing. The presence of this set was confirmed by observations in the tunnel and boreholes. The third main orientation is semi-horizontal and was confirmed mainly by borehole observations. Besides the reflectors following these main orientations, some isolated features were associated with a high-velocity feature found by tomographic analysis. In spite of the low Q factor of the rock, the acquisition system including SIST sources provided the level of detail needed for tomography and migration, while data of acceptable quality could not be obtained with single-pulse sources.

What is claimed is:

1. A method of seismic investigation using the swept impact seismic technique comprising measuring the response of a site to be investigated to a series of controlled impact sequences applied at different points of the site, each sequence comprising impacts generating pulses of energy at 100–5000 Hz, the impacts of the sequence having a repetition frequency swept between frequencies in the range of 10 to 500 Hz, the end frequencies having a ratio of at least 1.5 to 1, and the number of impacts in the sequence being at least 100.

2. A method according to claim 1, wherein the energy is generated at 500–2500 Hz, and the sweep frequency is in the range 10–250 Hz.

3. A method according to claim 1, wherein the number of impacts in a sequence is at least 500.

4. A method according to claim 1, wherein the impacts are generated by an electric demolition hammer and the impact rate is swept by varying the input voltage to the hammer.

5. A method according to claim 4, wherein the impact rate is swept between end points within the range 15–30 Hz.

6. A method according to claim 1, wherein the impacts are generated by a piezo-electric impact generator inserted in a borehole.

7. A method according to claim 6, wherein the impact rate is swept between end points in the range 70–180 Hz.

8. A method according to claim 6, wherein the impact generator is coupled to the borehole by liquid in the latter.

9. A method according to claim 1, further comprising receiving and decoding seismic signals transmitted through material of the site by the impacts, and processing the received signals in a sequence to cancel noise.

10. A method according to claim 9 wherein the signals are combined by summation.

11. A method according to claim 9, wherein the signals are processed by a median technique.

12. Apparatus for seismic investigation using the swept impact seismic technique, comprising an electrically-actuated hammer having an impact frequency variable through a range of at least 1.5:1 within the range 10 to 200 Hz, and generating impacts characterized by substantial energy within a frequency range of 200–4000 Hz, a drive circuit for energizing the hammer to deliver a sequence of at least 100 impacts having a repetition frequency swept through a ratio of at least 1.5 to 1, and means for repositioning the hammer between sequences.

13. Apparatus according to claim 12, wherein the impact frequency is in the range 10–100 Hz and the energy has a frequency in the range 500–2500 Hz.

14. Apparatus according to claim 12, wherein the sequence has at least 500 impacts.

15. Apparatus according to claim 12, wherein the electrically-actuated hammer is an electric demolition hammer having an impact frequency variable in the range 15–30 Hz, and the means for positioning the hammer is a handle on the hammer.

16. Apparatus according to claim 15, including a controller sweeping the supply potential applied to the hammer according to a program.

17. Apparatus according to claim 12, wherein the electrically-actuated hammer is a piezo-electric hammer having an impact frequency variable in the range 70–180

Hz, and the means for positioning the hammer is a housing moveable through a borehole.

18. Apparatus according to claim 17, including a controller generating high voltage pulses for application to the hammer, the repetition frequency of the pulses being swept according to a program.

19. Apparatus according to claim 17, wherein the piezoelectric hammer extends axially of the borehole, and includes an axial to radial energy converter to couple its energy to the borehole.

20. Apparatus according to claim 19, wherein the borehole is water filled, and the converter comprises an interleaved stack of two sets of plates relatively movable within the water to use the latter as a coupling medium.

21. Apparatus according to claim 19, wherein the converter comprises wedges, and a motor to drive and withdraw the wedges between the hammer and a wall of the borehole.

* * * * *